(12) United States Patent
Takacs et al.

(10) Patent No.: US 9,805,180 B2
(45) Date of Patent: Oct. 31, 2017

(54) MESSAGE SENDER AUTHENTICATION

(71) Applicant: BlackBerry Limited, Waterloo (CA)

(72) Inventors: Kristof Takacs, Waterloo (CA);
Jameson Bauer Hyde, Cambridge (CA); Marek Paruzel, Kitchener (CA)

(73) Assignee: BlackBerry Limited, Waterloo, Ontario (CA)

( * ) Notice: Subject to any disclaimer, the term of this patent is extended or adjusted under 35 U.S.C. 154(b) by 53 days.

(21) Appl. No.: 14/934,880

(22) Filed: Nov. 6, 2015

(65) Prior Publication Data

US 2017/0116400 A1 Apr. 27, 2017

Related U.S. Application Data

(60) Provisional application No. 62/247,097, filed on Oct. 27, 2015.

(51) Int. Cl.
*G06F 21/00* (2013.01)
*G06F 21/32* (2013.01)
(Continued)

(52) U.S. Cl.
CPC ............ *G06F 21/32* (2013.01); *G06F 9/4403* (2013.01); *G06F 21/44* (2013.01); *G06F 21/50* (2013.01);
(Continued)

(58) Field of Classification Search
CPC ........ G06F 21/32; G06F 9/4403; G06F 21/44; H04L 9/3242; H04L 9/3239
See application file for complete search history.

(56) References Cited

U.S. PATENT DOCUMENTS 6,049,838 A * 4/2000 Miller .................... G06F 9/465
  380/277
8,365,283 B1 * 1/2013 Satish .................. G06F 21/564
  713/152

(Continued)

OTHER PUBLICATIONS

Extended European Search Report dated Jun. 2, 2016, received for European Application No. 15201792.7.

*Primary Examiner* — Mohammad A Siddiqi
(74) *Attorney, Agent, or Firm* — Jeffrey N. Giunta; Fleit Gibbons Gutman Bongini & Bianco, P.L.

(57) ABSTRACT

A system and method to control establishing inter-process communications are disclosed. A message from a requesting process that is different from a serving process is received at the serving process via an inter-process communications facility. A current fingerprint of memory associated with the requesting process is determined. Whether a previously determined fingerprint is stored for the requesting process is determined where the previously determined fingerprint was determined since initialization of a processor executing the serving process. Based on a determination that the previously determined fingerprint is not stored, the current fingerprint is stored and a communications channel is established between the serving process and the requesting process. Based on a determination that the previously determined fingerprint is stored and that the previously determined fingerprint matches the current fingerprint, the communications channel is established between the serving process and the requesting process.

20 Claims, 5 Drawing Sheets

(51) Int. Cl.
  *G06F 9/44*    (2006.01)
  *G06F 21/44*   (2013.01)
  *H04L 9/32*    (2006.01)
  *G06F 21/50*   (2013.01)
  *G06F 21/60*   (2013.01)

(52) U.S. Cl.
  CPC .......... *G06F 21/606* (2013.01); *H04L 9/3239* (2013.01); *H04L 9/3242* (2013.01)

(56) References Cited

U.S. PATENT DOCUMENTS

| | | | |
|---|---|---|---|
| 8,582,838 B1* | 11/2013 | McCormick | G07D 7/2033 |
| | | | 382/124 |
| 2008/0133446 A1* | 6/2008 | Dubnicki | G06F 17/30159 |
| 2013/0132736 A1 | 5/2013 | Steele | |
| 2013/0347004 A1* | 12/2013 | Day | G06F 9/546 |
| | | | 719/313 |
| 2014/0205099 A1 | 7/2014 | Christodorescu et al. | |
| 2015/0074759 A1* | 3/2015 | Shanklin | G06F 21/51 |
| | | | 726/3 |
| 2016/0162207 A1* | 6/2016 | Sharma | G06F 17/30327 |
| | | | 711/162 |
| 2016/0314141 A1* | 10/2016 | Harnik | G06F 17/30153 |

* cited by examiner

MESSAGE SENDER AUTHENTICATION

CROSS-REFERENCE TO RELATED APPLICATIONS

This application claims priority under 35 U.S.C. §119 from prior provisional application 62/247,097 filed on Oct. 27, 2015. The entire collective teachings thereof being herein incorporated by reference.

FIELD OF THE DISCLOSURE

The present disclosure generally relates to computer security, and more particularly to identifying software modifications of modules communicating via inter-process communications.

BACKGROUND

Computing devices often include various software modules that communicate with each other through various techniques, such as via inter-process communications. These processes are able to communicate various types of data or other information that include data associated with, for example, controlling the operation of one or more of the communicating processes. In some situations, one or both processes exchanging information operate with elevated privileges and the exchanged information may affect the privileged processing.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which.

DETAILED DESCRIPTION

Figure 1:
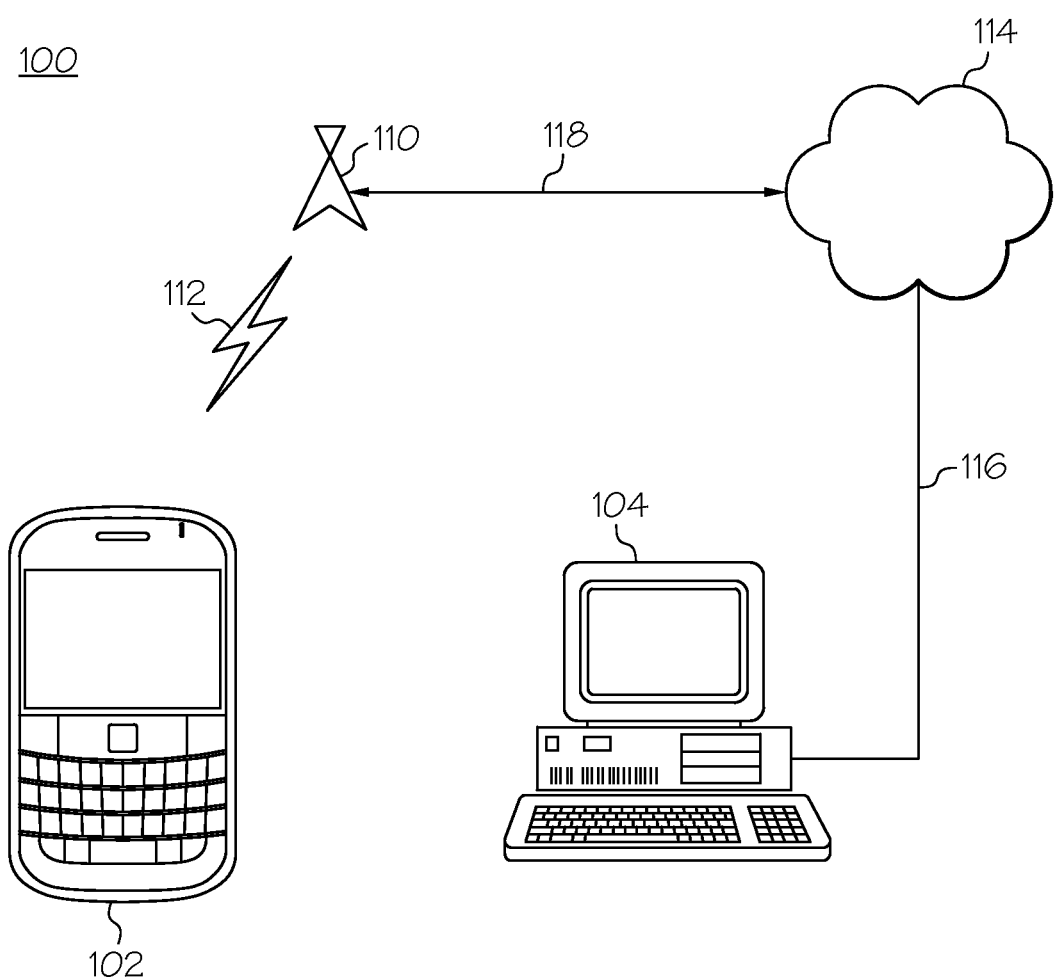
FIG. 1 illustrates a computing environment, according to an example.

Detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the present subject matter in virtually any appropriately detailed structure and function. Further, the terms and phrases used herein are not intended to be limiting, but rather, to provide an understandable description of the concepts.

The terms "a" or "an", as used herein, are defined as one or more than one. The term plurality, as used herein, is defined as two or more than two. The term another, as used herein, is defined as at least a second or more. The terms "including" and "having," as used herein, are defined as comprising (i.e., open language). The term "coupled," as used herein, is defined as "connected," although not necessarily directly, and not necessarily mechanically. The term "configured to" describes hardware, software or a combination of hardware and software that is adapted to, set up, arranged, built, composed, constructed, designed or that has any combination of these characteristics to carry out a given function. The term "adapted to" describes hardware, software or a combination of hardware and software that is capable of, able to accommodate, to make, or that is suitable to carry out a given function.

Computing devices include various software modules, such as operating system components, drivers, software modules to implement various operational aspects, other software modules, or combinations of these, that control various operations of the computing device. These software modules often operate with elevated privileges or permissions in order to access hardware, various functions, or combinations of these that are not accessible by other software components such as user programs. Some of these software modules are started when the computing device is powered on or otherwise initializes itself. Although some of these software modules begin execution when the device initializes, such software modules are able to be started at any time. Additionally, executing software modules are able to stop and restart during normal device operations.

The reliability and security of a computing device may be compromised by unauthorized operations performed by certain types of software. For example, a user may unknowingly install various types of damaging software, such as malicious software, that attempt to gain access to normally prohibited operations that are normally accessible only to software modules operating with elevated privileges. One technique used to gain unauthorized access to normally privileged operations is for an unauthorized software module patch executable code while the process is running in main memory. For example, an unauthorized software module is able to compromise the security of a device by modifying a vulnerable authorized software module that is legitimately operating with elevated privileges. In one example, the unauthorized software module injects new executable code into the memory space of that authorized software module. This injected new executable code is then able to operate with escalated privilege, is able to gain access to sensitive areas, perform other normally prohibited operations, or any combinations of these. Such an attack disguises the unauthorized, possibly malicious, code as being part of a trusted program. A device that has been successfully attacked in this manner could allow the unauthorized software to, for example, steal data, masquerade as a trusted application, form a stepping stone towards a larger scale attack or corporate data breach, perform other normally unauthorized operations, or combinations of these.

In addition to modifying authorized processes, certain types of executable code may attempt to masquerade as an authorized process. In an example, an unauthorized process may attempt to appear to be an authorized process to perform restricted processing, such as establishing or reestablishing a secure communications channel with a process executing with elevated privileges.

The below described systems and methods operate to identify when one or more processes that are communicating with one another may have been modified due to various causes, whether a process attempting to reestablish a communications channel is not the process that initially established that channel, or both. In an example of two processes communicating over a channel, one or both processes of those processes are able to operate with elevated privileges. In some examples, a particular process operating with elevated privileges is able to be configured to communicate with one or more particular processes. In an example, the two communicating processes are able to be started during a device initialization stage. The device initialization stage in some examples is able to be a trusted processing stage where the process controlling the initialization stage, and the processes that are started during the device initialization phase, are validated by various techniques and are able to be assumed to be unmodified and can be trusted to execute with elevated privileges.

In an example, processes that are started during the device initialization phase have software modules that are digitally signed by the source of the software module and are able to be verified by verifying that digital signature. In an example, the processing performed during the device initialization stage includes setting up secure communications channels between processes operating with elevated privileges. In some examples, certain processes should be precluded from communicating with processes that are operating with elevated privileges by suitable techniques.

In various examples, some devices begin operations with a system startup phase during which device initialization occurs and the execution of some privileged processes is started. Devices are able to enter a system startup phase based on various conditions or events, such as the device's being powered up, being reinitialized, when other events or conditions occur, or combinations of these. The software executing during this startup phase is normally limited to a defined set of software processes that initialize the device and start fundamental or other processes used to support general device operations. During the startup phase, user software or software not provided by the system manufacturer or other trusted sources are not usually executed.

An example of a system startup phase is a "booting state" where many system processes and trusted executable software modules are launched. The software modules defining these system processes and trusted executable software modules in one example are validated by various techniques and are able to be trusted as genuine and not modified. In an example, these software modules often stored along with a digital signature that is provided by the source of those software modules. The authenticity of the software module, and assurance that it has not been modified in an unauthorized manner, is able to be validated by verifying the digital signature with the presently stored software module. This validation of some or all of the software modules is able to be performed prior to starting the execution of a particular software module. Such validation is able to be performed in an early stage of the booting process.

After these initial system processes and trusted executable software modules are launched, the system generally transitions from the system startup phase to a device operational phase. The device operational phase generally follows the system startup phase and is a state in which any or most software present on the device is able to execute. The transition to the device operational phase in an example occurs after all of the device operating system and other support software, some of which operates with elevated privileges, has started execution.

The device initialization stage is performed and completed in some examples before the device enters a device operational stage. The device operational stage in some examples is a stage in which the device normally operates with user interactions and allows, for example, user processes, a larger set of processes or applications, or both, to execute. Once the device enters the device operational stage, there is a greater likelihood that the operating system or other trusted parts of the device may be compromised and, for example, unauthorized processes may attempt to establish a communications channel with one or both of the processes operating with elevated privileges that are communicating through a secure communications channel.

Some conventional systems create whitelists of processes that are able to communicate with particular processes that are executing with elevated privileges in order to control access to the privileged processing performed by those processes. This whitelist is able to be created in an example at the time the secure communications channel is set up. In an example, when a secure communication channel is set up between a process A and a process B, the process identifier of process B is added to a whitelist of processes that are able to communicate with process A. Some conventional systems are also able to control the processes that are able to communicate with each other by generating a random nonce that is used to identify the communications session, such as using the nonce as a session handle. This random nonce is shared between the two processes and is able to be changed in a predictable way with each message between the two processes.

The effectiveness of these conventional techniques may be reduced if, for example, one process crashes or otherwise terminates for valid reasons and is restarted as a different process. In an example, process A is configured to communicate with process B via a secure communications channel, but process B crashes. The device operations may be configured to automatically restart process B, but the new process may have different identifiers, such as process IDs or other metadata. In this discussion, this restarted process B is referred to as process B2. For effective device operation, this new process B2 should be able to reestablish communications with process A. However, the secure operation of the device should preclude other processes from, for example, posing as a restarted process B to establish a secure communications channel with process A. In some examples, identifiers associated with the executing process, such as User IDs or Group IDs (such as the UID or GID of POSIX systems), or other process attributes, can be verified, but these too can be impersonated by malicious software.

The below described systems and methods include operations to allow a process to identify, and later verify and validate, other processes with which it communicates. In an example, when a first process initially establishes a secure communications channel with a second process, the first process establishes a fingerprint of the second process. In an example within the context of the above described scenarios, process A is an example of a first process and process B is an example of a second process. When process A first establishes a secure communications channel with process B, process A operates to determine a fingerprint of process B. This may occur in some examples during the device initialization stage when the processes are assumed to be genuine and trusted. Process A is then able to later use this fingerprint for subsequent verification of other instances of process B that are attempting communication with process A.

In an example, this fingerprint is able to be calculated as a hash digest of the read-only and executable memory of the process, such as process B. Determining the fingerprint of memory for an executing process in some examples is able to include scanning the values stored in the executable sections of the process' memory space while the process is executing, and determining a respective hash value according to any suitable algorithm for the values stored in the memory of each process' memory space. In an example, the fingerprint is determined based on the SHA256 digital signature algorithm. Such a fingerprint in some examples consists of a respective hash value corresponding to the memory space of each process' memory space and results in a unique fingerprint of the memory section. In further examples, a fingerprint is able to be determined based on the values stored in the executable memory space of multiple processes where modification of any of those multiple processes is indicated by a difference in that one fingerprint.

In an example, a first process determines an initial fingerprint of the executable memory of the second process when a secure communications channel is initially established between these two processes. The first process is then able to store this initial fingerprint. When, for example, the second process crashes or is otherwise restarted, the newly restarted second process will attempt to reestablish communications with the first process. The first process is then able to determine a present fingerprint of the read-only and executable memory of the newly restarted second process at the time the second process attempts to reestablish the communications. The present fingerprint is then able to be compared to the stored initial fingerprint of the executable memory of the second process. If the fingerprints match, this indicates that the second process has not been modified and process A allows the secure communications channel to be reestablished. If the fingerprints do not match, this indicates that the second process has been modified and various responses may occur, such as rejecting the communications, reporting the discrepancy, other responses, or combinations of these. Because new processes in one example that attempt to establish communications with the first process have fingerprints that match the fingerprint of known processes, it is assumed that the new process that communicates with the first process will behave the same as the original second process that established the initial secure communications channel during the trusted device initialization stage.

In an example, the above described operations are implemented through specialized processing of messages received by a particular process, such as a process operating with elevated privileges. In summary, one example of the below described systems cause privileged processes to handle received messages as follows. 1) Wait for messages at a first process from other processes. 2) Once a message is received from a second process, calculate the fingerprint of the process sending the message. In an example, the fingerprint is calculated by reading and calculating a hash value for the executable memory for the sending process. 3a) If no fingerprint is stored for this particular sending process, store the calculated fingerprint, which is an initial fingerprint in this example, and handle the received message according to conventional rules. In an example, the calculated fingerprint is stored in the memory space of the first process. 3b) If the storage contains a stored, previously determined initial fingerprint for the second, sending, process, the newly calculated fingerprint is compared to the stored initial fingerprint. If the fingerprints do not match in one example, communications with the second process is denied in one example. If the fingerprints do match, the received message is handled according to conventional rules.

FIG. 1 illustrates a computing environment 100, according to an example. The computing environment 100 depicts two electronic devices, a portable electronic device 102 and a computer 104. In general, these electronic devices are used by individuals to perform various functions. These electronic devices are examples of devices that include data storage used to store applications, user data, system data, other data, or combinations of these. The illustrated electronic devices are only examples used to illustrate certain relevant aspects in this description and are not limiting. In general, a large variety of any type of suitable electronic device is able to incorporate data storage and one or more processors that use data stored in the data storage to perform restricted operations within the device. It is to be understood that the systems and methods described herein are applicable to any computing device that restricts some operations.

The depicted electronic devices are shown to be able to perform electronic communications with each other and with other devices (not shown) via a communications network 114. The portable electronic device 102 is in wireless communications with a wireless base station 110 via a wireless link 112. A wireless base station 110 is depicted for ease of understanding and description, but is understood to represent one or more wireless communications systems. Examples of communications system using a wireless base station 110 include long range wireless communications such as cellular communications systems, wide area wireless network systems, any other long range wireless communications system, or combinations of these. The wireless base station 110 is also able to include one or more shorter range wireless communications systems such as WiFi®, Bluetooth®, Near Field Communications (NFC), any other short range system, or combinations of these.

The wireless base station 110 and the computer 104 are connected to a communications network 114. Examples of the communications network 114 include, but are not limited to, the Internet, data communications networks connecting selected locations, any accessible network, any data communications network, or combinations of these. The computer 104 in the illustrated example is connected to the communications network 114 by a wired link 116. The wireless base station 110 in the illustrated example is connected to the communications network by a second wired link 118. The use of a simple link in this illustration is for ease of understanding and explanation, but it is understood that electronic devices and wireless nodes, such as the computer 104, wireless base station 110, other devices, or combinations of these, are able to be connected to the communications network 114 by any suitable technique. Particular connections to the communications network is able to be via, for example, sub-networks that include one or more of wired connections or wireless connections.

The electronic devices, such as the portable electronic device 102 or computer 104, include processors that are able to execute, for example, user software to perform various functions. In some examples, user software is able to be received via the communications networks and loaded into the electronic device. These electronic devices generally have certain restricted functions or other operating aspects that are not accessible to user software. These restricted functions in some examples control the operation or configuration of the electronic device, store sensitive or personal information, are associated with other sensitive operations or data, or the certain functions are able to include combinations of these. In general, the electronic devices have software modules, such as operating systems, drivers, other software, or combinations of these, that are able to access the restricted functions or other operating aspects of the electronic device that are generally not accessible to other software that is executing on the electronic device. These software modules that access restricted function or other operating aspects of the electronic device that are generally not accessible to other software that is executing on the electronic device are referred to as "privileged processes." In some examples, operating system permissions or similar constructs are used to identify which software that is able to access the restricted functions or other operating aspects of the electronic device.

The software modules within the electronic device, such as the portable electronic device 102 or computer 104, are able to communicate with one another via various techniques, such as inter-process communications facilities. In an example, some software modules within the device are able to establish secure communications channels with privileged processes, such as components of the device's operating system kernel. These secure communications channels are able to be established, for example, during a device initialization phase. As described in further detail below, some examples include processing to validate a process that attempts to establish a secure communications channel with a privileged process, such as when that process crashes and restarts.

Figure 2:
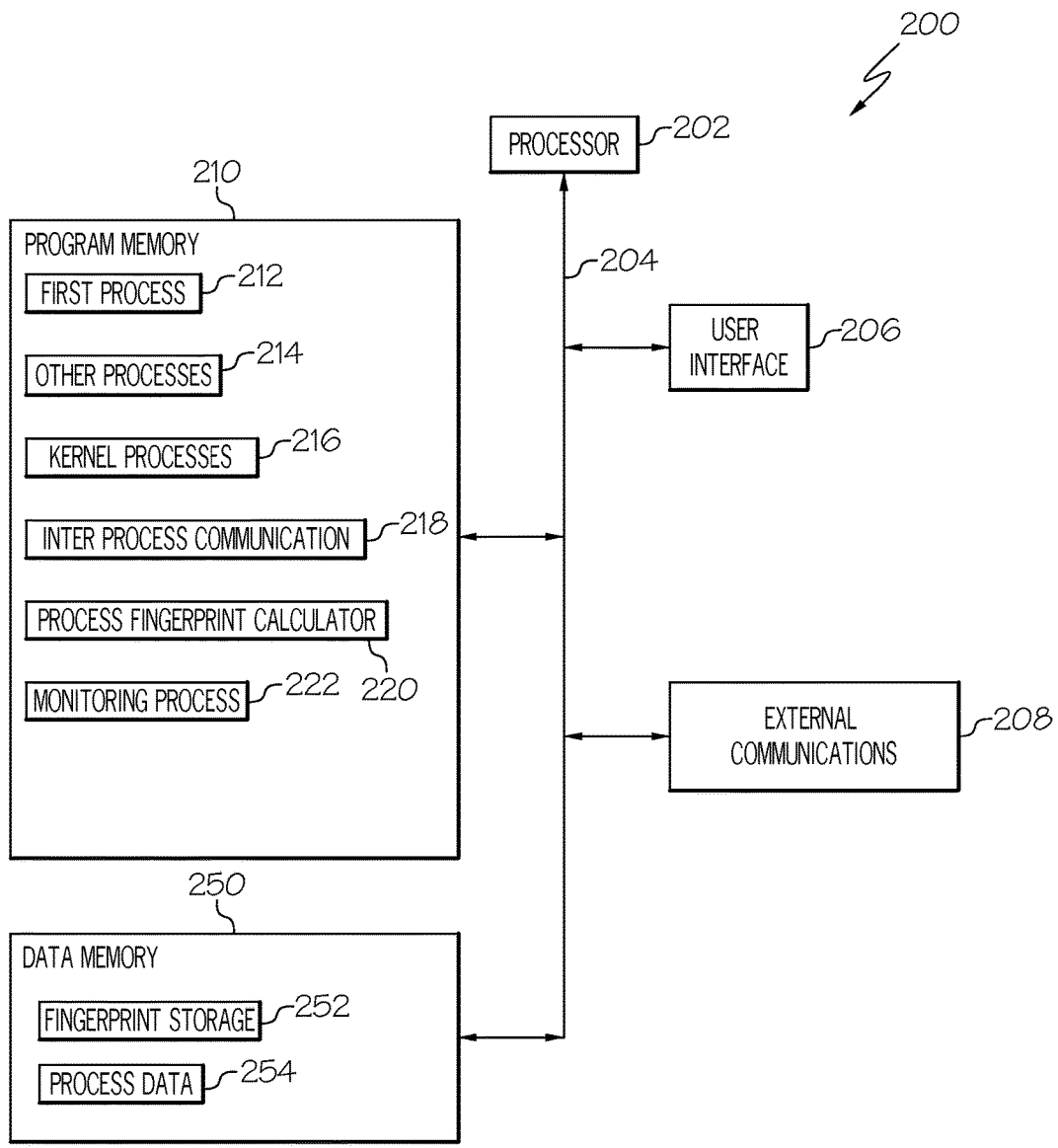
FIG. 2 illustrates an electronic device block diagram, according to an example.

FIG. 2 illustrates an electronic device block diagram 200, according to an example. The electronic device block diagram 200 depicts certain components of a communications device, such as examples of a portable electronic device 102 or computer 104 discussed above. The electronic device block diagram 200 includes a processor 202 that performs various processes implemented by the electronic device. The processor 202 interacts with other components of the electronic device block diagram 200 via a data bus 204. In the illustrated example, the processor 202 interacts with a user interface 206, external communications 208, a program memory 210, and a data memory 250. In further examples, an electronic block diagram 200 is able to include other components or is able to include fewer components than are illustrated in this example.

The user interface 206 in one example is able to include one or more facilities to allow a user to provide information to, or receive information from, the electronic device. The user interface 206 is able to support one or more types of user interaction, such as one or both of visual or audio outputs, one or both of touch inputs or voice recognition, other user interface techniques, or any combination of these.

The user interface 206 in one example includes visual displays such as graphical display screens, alphanumeric displays, visual displays of any nature, or combinations of these. The user interface 206 further provides any suitable user input facilities, such as physical keyboards, touch screen displays that may or may not include virtual keyboards, voice recognition, other input facilities, or combinations of these. In general, the user interface 206 is able to include components to support any type of user interaction with the electronic device, such as providing information to and presenting information from executable software operating on the processor 202.

The external communications component 208 in various examples is able to support any suitable type of communications between the electronic device and other devices, such as over the wireless link 112 or wired link 116 described above. The external communications component 208 in some examples is able to include long range wireless links such as voice or data communications over one or more cellular phone infrastructures, other long range wireless data links, other long range wireless voice links, or combinations of these. The external communications component 208 in some examples is able to include short range wireless communications. In some examples, the external communications is able to support Wi-Fi®, Bluetooth®, Near Field Communications (NFC), any other short range system, or combinations of these.

The program memory 210 in one example stores data in any suitable format that defines executable software that defines various processes, applications, other executable modules, components, or other structures, or combinations of these. In the following discussion, the term program memory is used in one example to refer to the portion of a device memory from which processor 202 retrieves program instructions that are then executed by the processor 202 in order implement a particular software process. An executing process in this discussion refers to a software process that is considered to be executing on the processor 202. An executing process may or may not be in a state of active execution by the processor 202. For example, an executing process may be in a dormant state or in a state that may be instantaneously inactive, but is generally considered to be executing as is understood by practitioners of ordinary skill in the relevant arts.

The illustrated program memory 210 depicts several executing software components. These executing software components in one example are data that include computer executable instructions to perform various functions, operations, or both, defined for those components. The executing software components shown in this depiction are examples of executing processes. In general, the program memory 210 of various devices is able to be modified during device operations, but such modifications are normally limited to specific circumstances. For example, modification of the program memory 210 is expected and authorized when new or updated software is being loaded into the device. In addition to such authorized modifications of program memory, unauthorized programs are able to modify programs stored in the program memory 210. Such unauthorized modifications of program memory, particular to the program code defining processes that execute with elevated privileges, may have potentially harmful effects on the device.

The illustrated program memory 210 stores kernel processes 216. In an example, the kernel processes 216 control the operation of the device as is understood by practitioners of ordinary skill in the relevant arts. In an example, portions of the kernel processes 216 begin execution when the device first powers up, is initialized or reinitialized, at other times, or at any combinations of these, to configure the software execution environment for the device. In an example, the kernel processes 216 include and init process that is generally executed to initialize the software operating environment of a device. In some examples, the init process is executed during the device initialization stage and supports, for example, starting other processes that are able to establish secure communications channels with privileged processes such as portions of the kernel processes 216.

The program memory 210 further stores several processes including a first process 212 and other processes 214. In general, some of these processes are able to be privileged processes that are started by the init process of the kernel processes 216 during device initialization when the init process is executed. Privileged processes in general are able to, for example, access generally restricted functions or other operating aspects of the device. A device is generally able to have any number of privileged processes. Some or all of the privileged processes are able to be started by the init process, but some of these and other privileged processes are also able to be started or restarted at any time during device operations. In general, a device's memory stores permission indications or privilege information for one or more stored data items and privileged processes have permission indications or privilege information that indicates the status of that process to execute with elevated privileges. In the present discussion, processes are described as operating with elevated privileges if the operating system of the device is configured to permit the process to access functions, operations, any other aspect, or combinations of these, of the device that is not generally available to all software executing on the device.

The program memory 210 includes an inter-process communications controller 218. In an example, an executing process, such as a process within the first process 212 or the other processes 214, is able to establish one or more communications channels with one or more different executing processes to exchange information to support the operations of those processes. The inter-process communications controller 218 in one example supports one or more of establishing, maintaining, or otherwise supervising these communications channels between or among different processes. The inter-process communications controller 218 in some examples is able to support one or more of establishing, maintaining, or otherwise supervising secure communications channels between or among processes. Secure communications channels in an example limit access to the data exchanged over the secure communications channel to the two or more processes that are communicating over that channel.

In an example, a particular process may be limited in its ability to establish certain types of communications channels with certain processes operating with elevated privileges, with processes within the kernel processes 216, with various other processes, or with combinations of these. In an example, processes that are permitted to establish certain types of communications channels with processes operating with elevated privileges may be limited by various techniques. For example, process permissions metadata that is associated with files storing the process in program memory, lists of authorized processes authorized to establish certain types of communications channels, a policy allowing the initial establishment of certain communications channels during the device initialization stage, other techniques, or combinations of these, may be used to limit the ability of various processes to establish certain types of communications channels with certain processes, such as processes operating with elevated privileges. In some examples, various actions are possible in response to an attempt by a process to establish a communications channel with a different process when that process is not authorized to establish that communications channel. For example, the inter-process communications controller 218 is able to deny establishment of the communications channel, report the attempt to establish an unauthorized communications channel, perform other actions, or combinations of these.

The inter-process communications controller 218 in some examples is able to control, limit, otherwise supervise, or combinations of these, the ability of processes to establish communications channels with certain different processes. As is described in further detail below, some communications channels, which are referred to as controlled communications channels below, are able to be established between two or among 3 or more processes.

In an example, one or more of the processes exchanging data through the controlled communications channel is or are monitored for changes between times when the controlled communications channel is first established, and at any time that the processes exchanging data over that controlled communications channel attempt to reestablish communications while the device is operating. Reestablishing a controlled communications channel may occur for a number of reasons, such as if one or more of the processes exchanging data through the controlled communication channel restarts during device operations.

Changes in a process associated with one or more controlled communications channel in one example are monitored by comparing fingerprints, such as hash values of the memory associated with the process, that are determined when the controlled communications channel is first established and upon reestablishment of the controlled communications channel. In some examples, a controlled communications channel is also able to be a secure communications channel. In further examples, a controlled communications channel is able to be any type of communications channel or inter-process communications facility.

The program memory 210 further includes a process fingerprint calculator 220. The process fingerprint calculator 220 in one example determines a fingerprint of the process definition stored in program memory for a process. Determining values of such a fingerprint for a process at different times and comparing the fingerprints that were calculated at these different times allows a determination of whether a definition of the process has changed between calculating this fingerprint value.

In some examples, the process fingerprint calculator 220 is able to determine a fingerprint for an executing process by examining memory locations associated with that executing process and calculating a hash value for the values stored in those memory locations. In an example, these hash values are able to be based on any suitable hash algorithm, such as the SHA256 algorithm, any other hash algorithm, or any other suitable algorithm. In further examples, the process fingerprint calculator is able to determine a fingerprint for an executing process by any suitable technique, such as checksums, other algorithms that support verification that a data set has been unaltered, or combinations of these. In various examples, the process fingerprint calculator 220 determines fingerprints for memory that includes one or more of: program memory storing program code executed by the processor to execute the executing process; data memory used by the executing process; a subset of program code executed by a processor to execute the executing process, or combinations of these. The process fingerprint calculator in some examples operates with the inter-process communications controller 218 to perform some operations, as is described in further detail below.

The illustrated program memory 210 includes a monitoring process 222. In various examples, the monitoring process 222 performs various functions to monitor the operations of the device. The monitoring process 222 in one example includes Mobile Device Management (MDM) functionality to monitor and control various aspects of mobile devices. In an example, the inter-process communications controller 218 is able to report to the monitoring program 222 any attempt to reestablish a communications channel by a process whose fingerprint has changed since that process first established that communications channel since the device was initialized. The monitoring program 222 is able to be configured to take various actions based on such a report.

The data memory 250 stores data that is used by the executable software to perform various functions, operations, or combinations of these. The illustrated data memory 250 includes a fingerprint storage 252 and process data 254. The fingerprint storage 252 within the data memory 250 stores one or more fingerprints for each process that has established a controlled communications channel with another process. In one example, the fingerprint storage 252 stores a separate hash value or similar type of value that is calculated for at least some of the processes that have established a controlled communications channel. In general, the fingerprints stored in the data memory 250 are able to consist of any data that is able to identify that the program code stored in the program memory for its associated process has not been altered.

The data memory 250 further includes process data 254. Process data 254 is data used by processes executing on the processor 202. Data in the process data 254 is able to be created by, modified by, otherwise used by, or combination of these by its associated processes. In some examples, the data used by a particular process is stored separately from the data used by other processes and access to the data of a particular process is limited to the process using that data, to other processes with privileges to access the data, or combinations of these. In an example, the process fingerprint calculator is also able to include the contents of some of the process data 254 for a process in determining a fingerprint for a particular process. The data memory used by an executing process is able to include all of the data memory being accessed by the executing process, a defined portion of the data memory being accessed by the executing process, a subset of the data memory being accessed by the executing process, other portions of the data memory associated with the executing process, or combinations of these.

Figure 3:
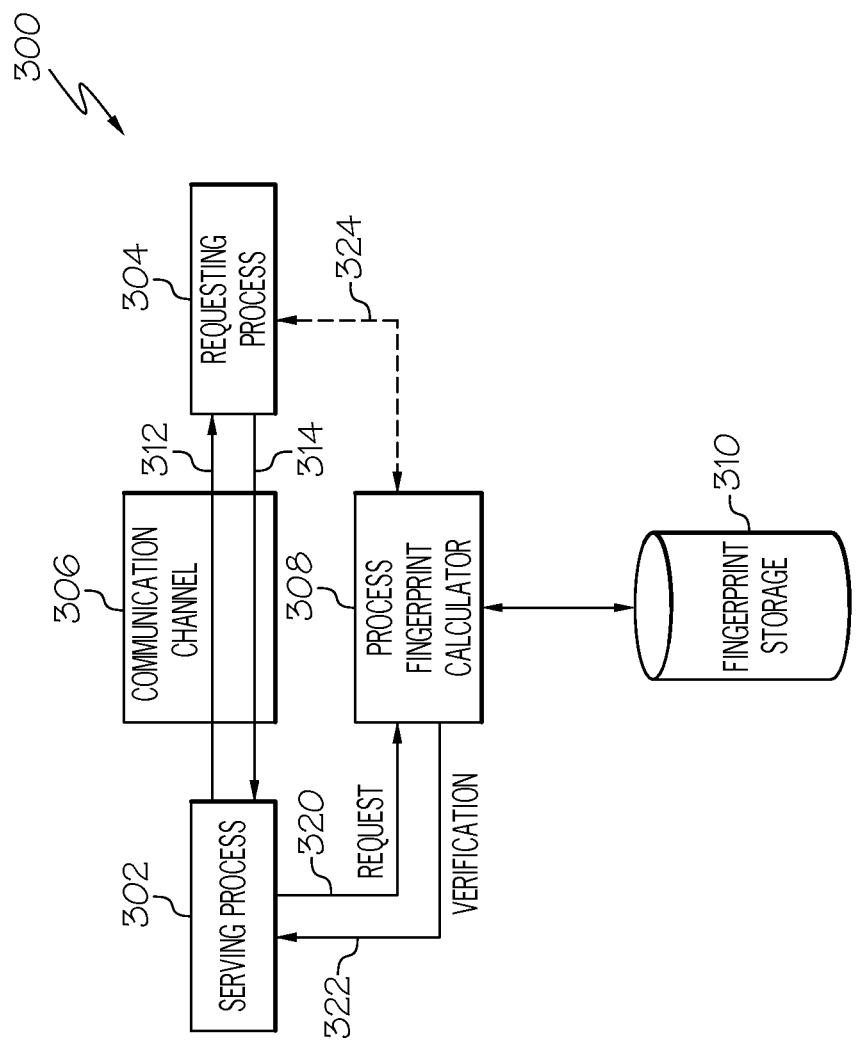
FIG. 3 illustrates a communications channel operating environment, according to an example.

FIG. 3 illustrates a communications channel operating environment 300, according to an example. The communications channel operating environment 300 depicts an example of processes and structures involved in establishing and maintaining a controlled communications channel. With reference to the electronic device block diagram 200 discussed above, the communications channel operating environment 300 depicts processes executing on the processor 202, where the processes are defined by data stored in the program memory 210 and use data stored in data memory 250. In an example, the communications channel included in the communications channel operating environment 300 in various examples is able to be first established during the device startup phase and continues into the device operational phase. The depicted communications channel is able to be reestablished after it is first established due to various events.

The communications channel operating environment 300 depicts a communications channel 306 that allows two processes, a serving process 302 and a requesting process 304, to exchange data. The communications channel 306 is an example of an inter-process communications facility. The requesting process 304 is a different process from the serving process 302. In an example, the communications channel 306 is established based on processing by the requesting process 304 to initiate communications with the serving process 302. In general, any process is able to initiate communications with one or more other processes.

The illustrated communications channel 306 is a bidirectional communications channel that includes a first communications link 312 to communicate data from the serving process 302 to the requesting process 304, and a second communications link 314 to communicate data from the requesting process 304 to the serving process 302. In various examples, any suitable communications channel or inter-process communications facility is able to be used to exchange data between or among executing processes. Although the illustrated communications channel 306 shows implementing communications between two processes, in some further examples, communications channels are able to support exchanging data between various numbers of processes, such as two, three, or more processes.

In the illustrated example, the communications channel 306 is a controlled communications channel as is discussed above. In an example, the requesting process 304 initiates setting up the communications channel 306 by sending a message to the serving process 302. The serving process 302 in an example works with the inter-process communications controller 218 in establishing and maintaining the communications channel 306.

The serving process 302 in one example receives a message from a different process to establish a communications channel In one example, this message is received from a process which does not have a currently configured communications channel with the serving process 302. When such a message is received, the serving process in an example performs processing to determine if a communications channel should be established with the requesting process 304. In an example, when the serving process 302 receives a message from a process for which there is not a presently configured communications channel, the serving process 302 sends a request 320 to the process fingerprint calculator 308. The process fingerprint calculator 308 in an example accesses 324 the program memory 210 storing the program instructions defining the requesting process 304 and determines a fingerprint for the current contents of the memory storing those program instructions. In an example, this fingerprint represents the program memory contents defining the currently executing requesting process 304.

In general, a communications channel is able to be established at any time during device operations. After a processor executing the serving process 302 is initialized, such as when a device implementing the depicted communications channel operating environment 300 first starts, the first request received by the serving process 302 from a particular requesting process 304 to establish a communications channel causes the process fingerprint calculator 308 to store the determined fingerprint in the fingerprint storage 310. If the requesting process 304 had already established a communications channel since the processor executing the serving process 302 was initialized, the currently determined fingerprint of the requesting process 304 is compared to the fingerprint that was stored in the fingerprint storage 310 when the communications channel 306 was first established.

After storing or comparing the currently determined fingerprint of the requesting process 304, the process fingerprint calculator 308 indicates to the serving process whether the communications channel 306 should be established. In the case of the requesting process 304 first establishing a communications channel with the serving process 302 since the processor executing the serving process 302 was initialized, the process fingerprint calculator 308 sends a verification 322 to the serving process indicating that the communications channel can be established. If the requesting process 304 had previously established a communications channel 306 and is now attempting to reestablish the communication channel 306, the process fingerprint calculator 308 will send a verification 322 that indicates whether the communications channel 306 can be established based on whether the stored fingerprint of the requesting process 304 matches the presently calculated fingerprint of the requesting process 304. If the currently calculated fingerprint matches the fingerprint stored in the fingerprint storage 310, the verification indicates that the communications channel can be established. If these fingerprints do not match, the verification 322 indicates the communications channel should not be established. In some examples, a verification 322 indicating that the communications channel should not be established causes the servicing process 302 to discard the message from the requesting process 304.

Figure 4:
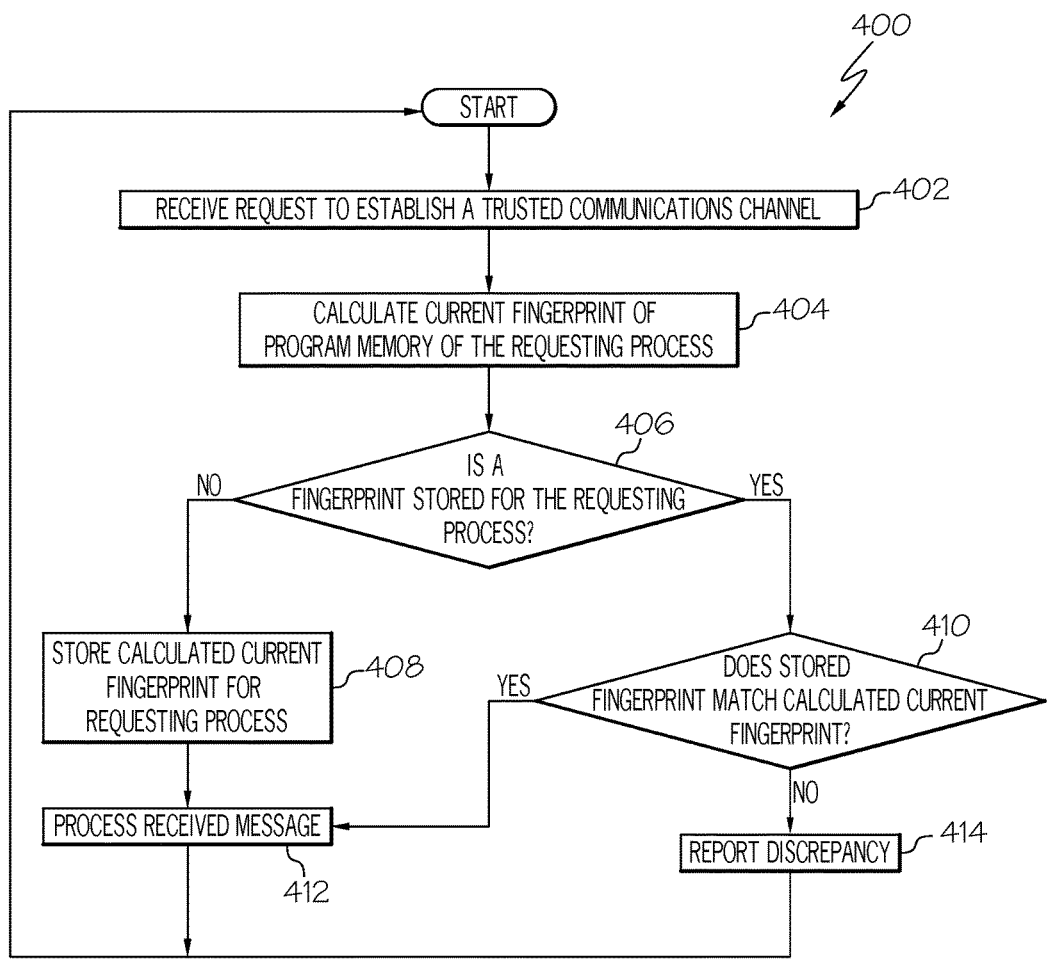
FIG. 4 illustrates a communications channel establishment method, according to an example

FIG. 4 illustrates a communications channel establishment method 400, according to an example. Referring to FIGS. 2 and 3, the communications channel establishment method 400 is a process executed by processor 202 to establish a communications channel 306 between a requesting process 304 and a serving process 302.

The communications channel establishment method 400 begins by receiving, at 402, a request from a requesting process to establish a trusted communications channel. In an example, the process receiving the request is referred to as a serving process. Once a request is received from a requesting process to establish a trusted communications channel, a current fingerprint is calculated, at 404, of program memory associated with the requesting process. In an example, the current fingerprint is a value that is calculated based upon values stored, during the determining of the current fingerprint, in a portion of memory associated with the requesting process. In various examples the current fingerprint is a checksum value calculated based upon, for example, values stored in a portion of program memory storing program code for the requesting process, the current fingerprint is a hash value calculated based upon values stored in a portion of program memory storing program code for the requesting process, is able to be any value that supports determining that values stored in the memory have changed, or combinations of these.

The communications channel establishment method 400 determines, at 406, if there is a previously determined fingerprint stored for the requesting process. In an example, this determination includes determining if a fingerprint has been stored since a processor executing the serving process 302 was initiated. In an example, initiation of the processor executing the serving process causes stored fingerprints to be cleared from memory. If it is determined that there is not a previously determined fingerprint stored for the requesting process, it is assumed that this is the first attempt by that process to establish a communications channel with the serving process since the processor executing the serving process was initiated. If it is determined that there is not a previously determined fingerprint stored for the requesting process, the communications channel establishment method 400 stores, at 408, the calculated current fingerprint for the requesting process. In an example, the currently calculated fingerprint is stored in memory associated with the serving process and will be a previously determined fingerprint available for later comparisons, as is described below.

Returning to determining, at 406, if it is determined that there is a previously determined fingerprint stored for the requesting process, the communications channel establishment method 400 determines, at 410, if the stored previously determined fingerprint value matches the calculated current fingerprint. If it is determined that these two fingerprints do not match, the discrepancy is reported, at 414. In an example, the request received, at 402, is also discarded if the fingerprints do not match. The communications channel establishment method 400 then returns to receiving, at 402, a request to establish a trusted communication channel, as is described above.

Returning to storing the calculated current fingerprint, at 408, or to determining that the fingerprints match, at 410, after either of these, the communications channel establishment method 400 processes the message received from the requesting process, at 412. In an example, processing the message results in establishment of a secure communications channels between the requesting process and the serving process. The communications channel establishment method 400 then returns to receiving, at 402, a request to establish a trusted communication channel, as is described above.

In an example, the first request to establish a trusted communications channel, at 402, and the subsequent processing through storing the calculated fingerprint, at 408, is performed during the device initialization phase. In an example, one or both of the requesting process or the serving process are able to be started by a device init process during device initialization.

Figure 5:
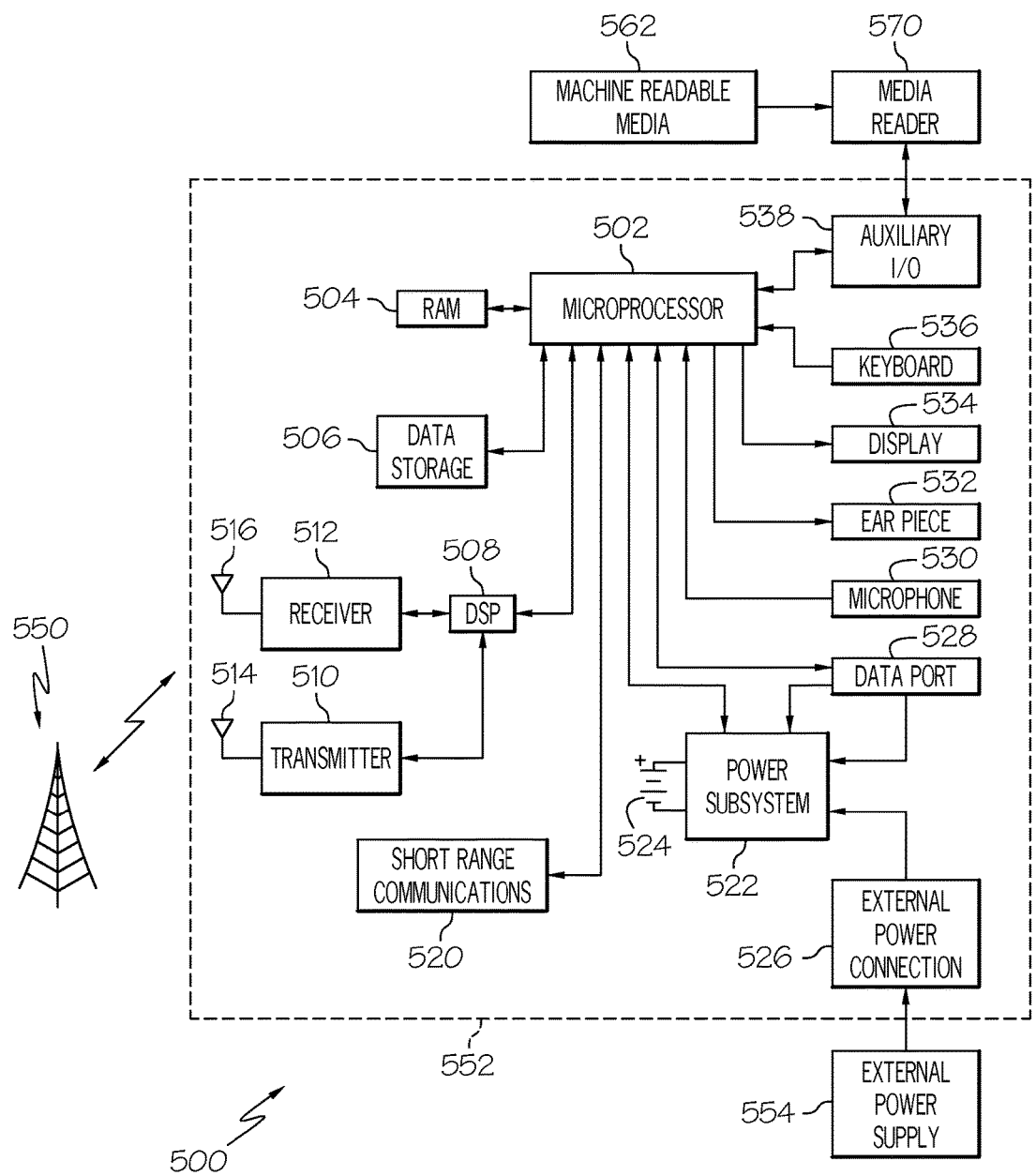
FIG. 5 is a block diagram of an electronic device and associated components in which the systems and methods disclosed herein may be implemented.

FIG. 5 is a block diagram of an electronic device and associated components 500 in which the systems and methods disclosed herein may be implemented. In various examples, the electronic device 552 is able to be an example of the above described portable electronic device 102, which is an example of a wireless two-way communication device with voice, text chat, and data communication capabilities. In some examples, electronic devices support data communications without supporting voice communications. For example, some electronic devices support data communications via a local data communications network, such as a WiFi® network. In some examples, devices may support voice communications via various technique, such as Voice over Internet Protocol (VoIP), using systems such as BlackBerry Messenger® Voice, other voice over data systems, or combinations of these. Such electronic devices communicate with a wireless voice, text chat, or data network 550 using a suitable wireless communications protocol. Wireless voice communications are performed using either an analog or digital wireless communication channel. Data communications allow the electronic device 552 to communicate with other computer systems via the Internet. Examples of electronic devices that are able to incorporate the above described systems and methods include, for example, a data messaging device, a two-way pager, a cellular telephone with text and data messaging capabilities, a wireless Internet appliance or a data communication device that may or may not include telephony capabilities.

The illustrated electronic device 552 is an example electronic device that includes two-way wireless communications functions. Portions of the above described external communications 208 are examples of these two-way wireless communications functions. Such electronic devices incorporate communication system elements such as a wireless transmitter 510, a wireless receiver 512, and associated components such as one or more antenna elements 514 and 516. A digital signal processor (DSP) 508 performs processing to extract data from received wireless signals and to generate signals to be transmitted. The particular design of the communication system is dependent upon the communication network and associated wireless communications protocols with which the device is intended to operate.

The electronic device 552 includes a microprocessor 502 that controls the overall operation of the electronic device 552. The above described processor 202 is an example of the microprocessor 502. The microprocessor 502 interacts with the above described communications system elements and also interacts with other device systems. In various examples, the electronic device 552 is able to include one or more of various components such as a data storage 506, random access memory (RAM) 504, auxiliary input/output (I/O) device 538, data port 528, display 534, keyboard 536, earpiece 532, audio sound reproduction system 570, microphone 530, a short-range communications system 520, a power system 522, other systems, or combinations of these.

One or more power storage or supply elements, such as a battery 524, are connected to a power system 522 to provide power to the circuits of the electronic device 552. The power system 522 includes power distribution circuitry for providing power to the electronic device 552 and also contains battery charging circuitry to manage recharging the battery 524 (or circuitry to replenish power to another power storage element). The power system 522 receives electrical power from external power supply 554. The power system 522 is able to be connected to the external power supply 554 through a dedicated external power connector (not shown) or through power connections within the data port 528. The power system 522 includes a battery monitoring circuit that is operable to provide a status of one or more battery status indicators, such as remaining capacity, temperature, voltage, electrical current consumption, and the like, to various components of the electronic device 552.

The data port 528 is able to support data communications between the electronic device 552 and other devices through various modes of data communications, such as high speed data transfers over an optical communications circuits. Data port 528 is able to support communications with, for example, an external computer or other device. In some examples, the data port 528 is able to include electrical power connections to provide externally provided electrical power to the electronic device 552, deliver electrical power from the electronic device 552 to other externally connected devices, or both. Data port 528 of, for example, an electronic accessory is able to provide power to an electronic circuit, such as microprocessor 502, and support exchanging data between the microprocessor 502 and a remote electronic device that is connected through the data port 528.

Data communication through data port 528 enables a user to set preferences through the external device or through a software application and extends the capabilities of the device by enabling information or software exchange through direct connections between the electronic device 552 and external data sources rather than via a wireless data communication network. In addition to data communication, the data port 528 provides power to the power system 522 to charge the battery 524 or to supply power to the electronic circuits, such as microprocessor 502, of the electronic device 552.

Operating system software used by the microprocessor 502 is stored in data storage 506. Examples of data storage 506 are able to include, for example, flash memory, magnetic based storage devices, other volatile or non-volatile data store elements, or the like. The data storage 506 is an example is able to include the above described program memory 210 and data memory 250. Some examples are able to use data storage 506 that includes a battery backed-up RAM or other non-volatile storage data elements to store operating systems, other executable programs, or both. The operating system software, device application software, or parts thereof, are able to be temporarily loaded into volatile data storage such as RAM 504. Data received via wireless communication signals or through wired communications are also able to be stored to RAM 504. The microprocessor 502 in some examples includes a component, such as is able to be defined in data storage 506 in one example, that include the processes described above that are stored in the program memory 210.

The microprocessor 502, in addition to its operating system functions, is able to execute software applications on the electronic device 552. A set of applications that control basic device operations, including at least data and voice communication applications, is able to be installed on the electronic device 552 during manufacture. In an example, programs and other data used to support the processes described above are able to be installed in the memory of the electronic device 552. Further examples of applications that are able to be loaded onto the device may be a personal information manager (PIM) application having the ability to organize and manage data items relating to the device user, such as, but not limited to, e-mail, calendar events, voice mails, appointments, and task items. The applications are able to include the above described base applications, which may be installed during manufacture or from another trusted and verified source, along with user applications that may be installed at any time.

Further applications may also be loaded onto the electronic device 552 through, for example, the wireless network 550, an auxiliary I/O device 538, Data port 528, short-range communications system 520, or any combination of these interfaces. Such applications are then able to be installed by a user in the RAM 504 or a non-volatile store for execution by the microprocessor 502.

In a data communication mode, a received signal such as a text message or web page download is processed by the communication system, including wireless receiver 512 and wireless transmitter 510, and communicated data is provided the microprocessor 502, which is able to further process the received data. In some examples, the electronic device 552 includes a display, output ports, or combinations of these. In such examples, the received data is able to be processed for output to the display 534, or alternatively, to an auxiliary I/O device 538 or the Data port 528. In examples of the electronic device 552 that include a keyboard 536 or other similar input facilities, a user of the electronic device 552 may also compose data items, such as e-mail messages, using the keyboard 536, which is able to include a complete alphanumeric keyboard or a telephone-type keypad, in conjunction with the display 534 and possibly an auxiliary I/O device 538. Such composed items are then able to be transmitted over a communication network through the communication system.

For voice communications, overall operation of the electronic device 552 is substantially similar, except that received signals are generally provided to an earpiece 532 and signals for transmission are generally produced by a microphone 530. Alternative voice or audio I/O systems, such as a voice message recording system, may also be implemented on the electronic device 552. Although voice or audio signal output is generally accomplished primarily through the earpiece 532, in examples of electronic devices 552 that include a display 534, the display 534 may also be used to provide an indication of the identity of a calling party, the duration of a voice call, or other voice call related information, for example.

Depending on conditions or statuses of the electronic device 552, one or more particular functions associated with a system circuit may be disabled, or an entire system circuit may be disabled. For example, if the battery temperature is low, then voice functions may be disabled, but data communications, such as e-mail, may still be enabled over the communication system.

A short-range communications system 520 provides for data communication between the electronic device 552 and different systems or devices, which need not necessarily be similar devices. For example, the short-range communications system 520 includes an infrared device and associated circuits and components or a Radio Frequency based communication module such as one supporting Bluetooth® communications, to provide for communication with similarly-enabled systems and devices, including the data file transfer communications described above. The short-range communications system is also able to include one or more of components to support communications over wireless links such as WiFi®, Near Field Communications (NFC), any other short range link, or combinations of these.

A media reader 560 is able to be connected to an auxiliary I/O device 538 to allow, for example, loading computer readable program code of a computer program product into the electronic device 552 for storage into data storage 506. One example of a media reader 560 is an optical drive such as a CD/DVD drive, which may be used to store data to and read data from a computer readable medium or storage product such as computer readable storage media 562. Examples of suitable computer readable storage media include optical storage media such as a CD or DVD, magnetic media, or any other suitable data storage device. Media reader 560 is alternatively able to be connected to the electronic device through the Data port 528 or computer readable program code is alternatively able to be provided to the electronic device 552 through the wireless network 550.

Information Processing System

The present subject matter can be realized in hardware, software, or a combination of hardware and software. A system can be realized in a centralized fashion in one computer system, or in a distributed fashion where different elements are spread across several interconnected computer systems. Any kind of computer system—or other apparatus adapted for carrying out the methods described herein—is suitable. A typical combination of hardware and software could be a general purpose computer system with a computer program that, when being loaded and executed, controls the computer system such that it carries out the methods described herein.

The present subject matter can also be embedded in a computer program product, which comprises all the features enabling the implementation of the methods described herein, and which—when loaded in a computer system—is able to carry out these methods. Computer program in the present context means any expression, in any language, code or notation, of a set of instructions intended to cause a system having an information processing capability to perform a particular function either directly or after either or both of the following a) conversion to another language, code or, notation; and b) reproduction in a different material form.

Each computer system may include, inter alia, one or more computers and at least a computer readable medium allowing a computer to read data, instructions, messages or message packets, and other computer readable information from the computer readable medium. The computer readable medium may include non-transitory computer readable storage medium embodying non-volatile memory, such as read-only memory (ROM), flash memory, disk drive memory, CD-ROM, and other permanent storage. Additionally, a computer medium may include volatile storage such as RAM, buffers, cache memory, and network circuits. Furthermore, the computer readable medium may comprise computer readable information in a transitory state medium such as a network link and/or a network interface, including a wired network or a wireless network, that allow a computer to read such computer readable information.

NON-LIMITING EXAMPLES

Although specific embodiments of the subject matter have been disclosed, those having ordinary skill in the art will understand that changes can be made to the specific embodiments without departing from the spirit and scope of the disclosed subject matter. The scope of the disclosure is not to be restricted, therefore, to the specific embodiments, and it is intended that the appended claims cover any and all such applications, modifications, and embodiments within the scope of the present disclosure.

What is claimed is:

1. A method, comprising:
   receiving, at a serving process via an inter-process communications facility from a requesting process that is different from the serving process, a message communicating between the requesting process and the serving process;
   determining, based on receiving the message, a current fingerprint of memory associated with the requesting process;
   determining, based on receiving the message, whether a previously determined fingerprint is stored for the requesting process, the previously determined fingerprint being determined since initialization of a processor executing the serving process;
   based on receiving the message and based on a determination that the previously determined fingerprint is not stored:
     storing the current fingerprint; and
     establishing a communications channel between the serving process and the requesting process;
   based on receiving the message and based on a determination that the previously determined fingerprint is stored, determining that the previously determined fingerprint matches the current fingerprint based on a comparison of the previously determined fingerprint and the current fingerprint; and
   establishing the communications channel between the serving process and the requesting process based on receiving the message, based on the determination that the previously determined fingerprint is stored and based on the determination that the previously determined fingerprint matches the current fingerprint.

2. The method of claim 1, further comprising, based on a determination that the previously determined fingerprint is stored and that the comparison of the previously determined fingerprint and the current fingerprint indicates that the previously determined fingerprint does not match the current fingerprint, discarding the message.

3. The method of claim 1, wherein the receiving the message and determining the current fingerprint occurs during a device initialization phase.

4. The method of claim 1, wherein the current fingerprint comprises a value calculated based upon values stored, during the determining of the current fingerprint, in a portion of memory associated with the requesting process.

5. The method of claim 1, wherein the current fingerprint comprises a checksum value calculated based upon values stored in a portion of program memory storing program code for the requesting process.

6. The method of claim 1, wherein the current fingerprint comprises a hash value calculated based upon values stored in a portion of program memory storing program code for the requesting process.

7. The method of claim 6, wherein the hash value is based upon a SHA256 algorithm.

8. A device, comprising:
a processor;
a memory coupled to the processor;
an inter-process communications controller, coupled to the processor and memory, the inter-process communications controller, when operating, being configured to:
receive, at a serving process via an inter-process communications facility from a requesting process that is different from the serving process, a message communicating between the requesting process and the serving process;
determine, based on receipt of the message, a current fingerprint of memory associated with the requesting process;
determine, based on receipt of the message, whether a previously determined fingerprint is stored for the requesting process, the previously determined fingerprint being determined since initialization of a processor executing the serving process;
based on receipt of the message and based on a determination that the previously determined fingerprint is not stored:
store the current fingerprint; and
establish a communications channel between the serving process and the requesting process;
based on receipt of the message and based on a determination that the previously determined fingerprint is stored, determining that the previously determined fingerprint matches the current fingerprint based on a comparison of the previously determined fingerprint and the current fingerprint; and
establish the communications channel between the serving process and the requesting process based on receipt of the message, based on the determination that the previously determined fingerprint is stored and based on the determination that the previously determined fingerprint matches the current fingerprint.

9. The device of claim 8, wherein the inter-process communications controller, when operating, is further configured to, based on a determination that the previously determined fingerprint is stored and that the comparison of the previously determined fingerprint and the current fingerprint indicates that the previously determined fingerprint does not match the current fingerprint, discard the message.

10. The device of claim 8, wherein the inter-process communications controller, when operating, is configured to receive the message and determine the current fingerprint during a device initialization phase.

11. The device of claim 8, wherein the current fingerprint comprises a value calculated based upon values stored, during determination of the current fingerprint, in a portion of memory associated with the requesting process.

12. The device of claim 8, wherein the current fingerprint comprises a checksum value calculated based upon values stored in a portion of program memory storing program code for the requesting process.

13. The device of claim 8, wherein the current fingerprint comprises a hash value calculated based upon values stored in a portion of program memory storing program code for the requesting process.

14. The device of claim 13, wherein the hash value is based upon a SHA256 algorithm.

15. A non-transitory computer readable storage medium having computer readable program code embodied therewith, the computer readable program code comprising instructions executable by a processor to:
receive, at a serving process via an inter-process communications facility from a requesting process that is different from the serving process, a message communicating between the requesting process and the serving process;
determine, based on receipt of the message, a current fingerprint of memory associated with the requesting process;
determine, based on receipt of the message, whether a previously determined fingerprint is stored for the requesting process, the previously determined fingerprint being determined since initialization of a processor executing the serving process;
based on receipt of the message and based on a determination that the previously determined fingerprint is not stored:
store the current fingerprint; and
establish a communications channel between the serving process and the requesting process;
based on a determination that the previously determined fingerprint is stored and that the previously determined fingerprint matches the current fingerprint based on a comparison of the previously determined fingerprint and the current fingerprint; and
establish the communications channel between the serving process and the requesting process based on receipt of the message, based on the determination that the previously determined fingerprint is stored and based on the determination that the previously determined fingerprint matches the current fingerprint.

16. The non-transitory computer readable storage medium of claim 15, wherein the computer readable program code further comprising instructions executable by a processor to, based on a determination that the comparison of the previously determined fingerprint and the current fingerprint indicates that the previously determined fingerprint is stored and that the previously determined fingerprint does not match the current fingerprint, discard the message.

17. The non-transitory computer readable storage medium of claim 15, wherein the computer readable program code to receive the message and to determine the current fingerprint execute during a device initialization phase.

18. The non-transitory computer readable storage medium of claim 15, wherein the current fingerprint comprises a value calculated based upon values stored, during the determining of the current fingerprint, in a portion of memory associated with the requesting process.

19. The non-transitory computer readable storage medium of claim 15, wherein the current fingerprint comprises a checksum value calculated based upon values stored in a portion of program memory storing program code for the requesting process.

20. The non-transitory computer readable storage medium of claim 15, wherein the current fingerprint comprises a hash value calculated based upon values stored in a portion of program memory storing program code for the requesting process.

* * * * *